Dec. 3, 1940. L. M. FINES 2,223,800
HAND CONTROLLED BRAKING MECHANISM
Filed Sept. 23, 1939
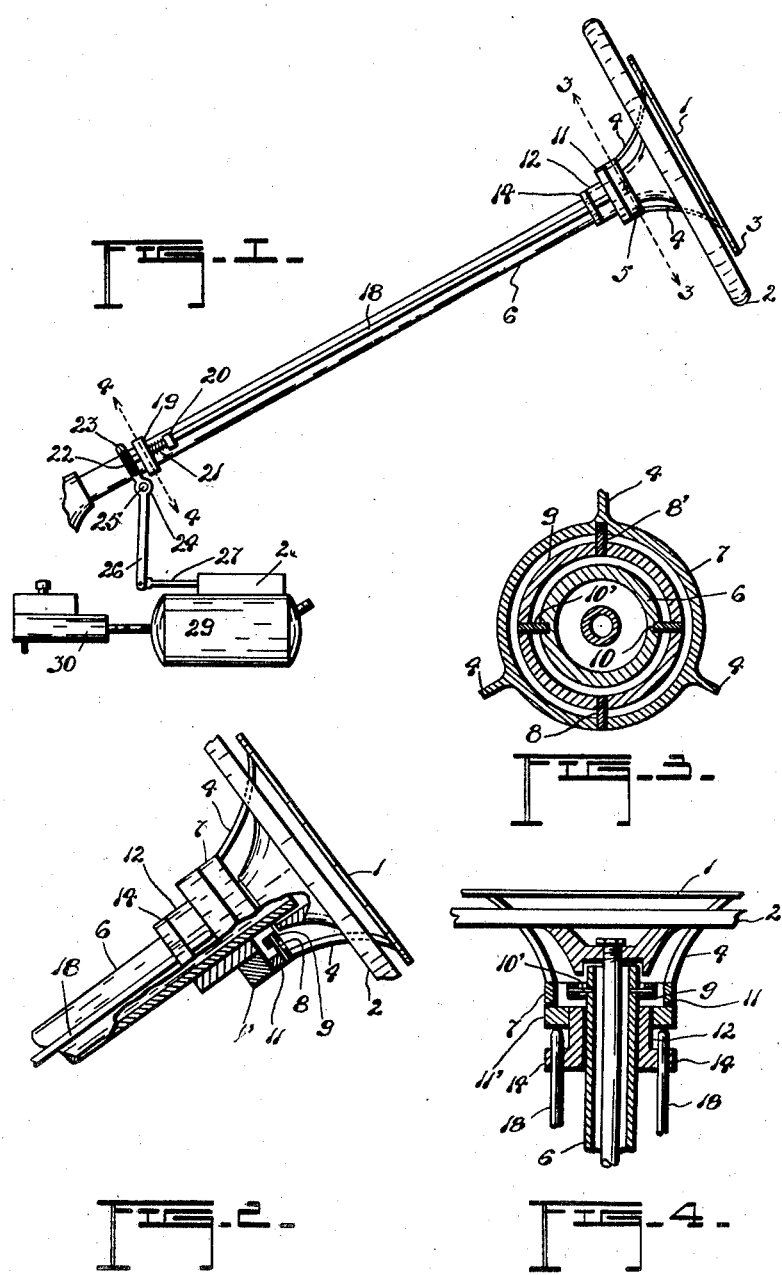
Inventor
L.M. Fines.
By his attorneys Patented Dec. 3, 1940

2,223,800

UNITED STATES PATENT OFFICE 2,223,800

HAND CONTROLLED BRAKING MECHANISM

Leonard M. Fines, Gunton, Manitoba, Canada

Application September 23, 1939, Serial No. 296,324

2 Claims. (Cl. 74—436)

My invention relates to improvements in brake actuating mechanisms, and the principal object of my invention is to provide a device of the character herewithin described, which would operate the service brakes of an automobile or a similar vehicle to which it is applied, by means of a hand control suitably mounted upon the steering wheel.

A further object of my invention is to provide a device of the character herewithin described by the use of which the driver of an automobile would be enabled to apply his brakes more rapidly following the visual perception of the necessity for doing so than is the case with foot-braking mechanism.

A further object of my invention is to provide a device of the character herewithin described by the use of which an automobile may be more conveniently handled when ascending hills and especially when it is necessary to apply the brakes on such hills or to stop and restart.

A further object of my invention is to provide a device of the character herewithin described by the use of which persons suffering from leg disabilities may be enabled to apply the brakes of an automobile.

A further object of my invention is to provide a device of the character herewithin described which is visible at all times to the driver instead of being positioned in the darkness beneath the indicator panel of automobiles.

A further object of my invention is to provide a device of the character herewithin described by the use of which greater flexibility of operation is possible with a vehicle so equipped due to the fact that eye and hand responses are more rapid than eye and foot responses.

A further object of my invention is to provide a device of the character herewithin described, the installation and operation of which would in no way interfere with the conventional methods of brake control.

With the above more important objects in view and such other minor objects as may appear as the specification proceeds, my invention consists essentially in the arrangement and construction of parts all as hereinafter more particularly described, reference being had to the accompanying drawing, in which:

Figure 1 shows a side elevation of my invention.

Figure 2 is a fragmentary detail illustrating the control ring assembly, partially broken away to reveal the construction of the interior.

Figure 3 is a cross-sectional view along the line 3—3 of Figure 1, and showing the component parts of the universal pivot.

Figure 4 is a cross-sectional view taken along the line 4—4 in Figure 1.

In the drawing like characters of reference indicate corresponding parts in the different figures.

The disadvantages of the conventional foot-braking mechanism reside in the fact that in the first place it is liable to be confusing in emergency especially when the driver is unfamiliar with the particular car he is handling in view of the fact that he has to rely upon a sense of touch and in some automobiles the foot-brake is further from the accelerator than in others, in addition to which the pressure plate of the foot-brake may in some cases be spaced further from the floor-board than in others.

In addition, occasions arise where the foot is liable to slip off the brake especially when the soles of the shoes are muddy or wet. Ice, frost or snow also make positive application of foot-brakes in automobiles difficult and of course, as is well-known, the foot-brake of an automobile is in darkness which is a further handicap.

My invention eliminates all the foregoing disadvantages as will readily be apparent by reference to the accompanying drawing and this description, from which it will be seen that the same consists of an annular ring 1 positioned in a suitable parallel relationship to the conventional steering wheel 2, and consisting of a circumferential member 3 and a plurality of radially extending spokes 4. The lower extremities of the latter are secured to a hereinafter detailed universal pivot assembly 5 mounted upon the outer, stationary casing 6 of the steering column.

The said pivot assembly 5 comprises an outer annular ring 7 pivotally attached by means of a pair of diametrically opposed fulcrum pins 8, 8', to an interposed ring 9. A pair of similar, diametrically opposed pins 10, 10' placed at an angular magnitude of ninety degrees in respect to the aforementioned pins 8, 8', pivotally attaches the said ring 9 to the stationary casing 6. The fulcrum pins 8, 8', 10, 10', are journalled in suitable apertures provided for such purposes in the walls of the rings 7 and 9, and the wall of the steering column casing 6.

An annular shoulder 11 formed essentially as shown in Figure 2 by increasing the width of the outer ring 7 beyond or below that of the inner ring 9 is in engagement with a cylindrical sleeve 11' slidably positioned upon a co-operating bushing member 12. The latter is secured directly to the stationary casing 6 and the lower portion of its lateral wall is provided with a pair of diametrically opposed extension brackets 14, 14, and apertures are formed therein.

A pair of longitudinal shafts 18, 18 are journalled in the said apertures and extend in parallel to the center line of the casing 6. A bushing 19, comparatively narrower, but similar in cross-sectional formation shown in Figure 4 to the aforementioned bushing 12, is equipped with corresponding extension brackets and apertures therein provided, to form bearings for the lower ends of the said shafts 18, 18. The upper extremities of the latter are maintained in constant contact with the lower face of the sliding sleeve 11', by means of collars 20 secured to the shafts 18, 18 and forced upwards by the resiliency of interposed coil springs 21.

A stationary pivot bolt 22 secured to the lower end of the shaft 18 engages within a longitudinal slot 23 embodied in the shorter arm of a double arm crank 24. The latter is fulcrumed on a suitable shaft 25, and an identical crank arrangement is duplicated behind the steering column 6 to facilitate connection to a corresponding pivot bolt secured to the other shaft 18.

The comparatively longer arm 26 of the crank 24 then, by means of a connecting link 27, actuates a control valve 28 of a power booster mechanism 29. The latter together with the said valve 28 and the conventional hydraulic brake master cylinder 30 which they operate, form no constituent part of this invention and hence are not more fully detailed.

Having thus stated the constructional details of my invention, I shall now present a description of its mode of operation.

When it is required to actuate the brake mechanism of a vehicle embodying the principles of my invention, a slight downward pressure applied anywhere along the constituent members of the ring 1 will be transmitted through the fulcrum points 8, 8', 10, 10' of the universal pivot assembly 5 to the sliding sleeve 11' and hence to the extension shafts 17 and 18.

The linear movement at the lower extremities of the latter will be transmitted to the connecting link 27 by the radial motion of the cranks 25 and thus actuate the booster valve 28. This in turn, will operate the power booster assembly 29 and the brake master cylinder 30 thereunto connected.

It will be observed that since my invention forms no part of the conventional means of brake control, it may be used in such capacity either independently or simultaneously with the latter. Also, by modifying the actuated booster assembly 29 and its attachments, the device may be utilized equally well in connection with air, electric or mechanical brake systems.

From the foregoing it will be apparent that my invention is readily susceptible to incorporation as an integral part of an automobile at the time of its manufacture and also may be equally well installed as an accessory at any time thereafter.

Since various modifications can be made in the above invention, and many apparently widely different embodiments of same, made within the scope of the claims without departing from the spirit and scope thereof, it is intended that all matter contained in the accompanying specification shall be interpreted as illustrative only and not in a limiting sense and I desire only such limitations placed thereon as are specifically expressed in the accompanying claims.

What I claim as my invention is:

1. A hand-controlled braking mechanism for automobiles comprising in combination, an endwise movable shaft extending downwardly from a point adjacent the steering wheel of said automobile, a hand-control element situated adjacent the upper end of said shaft, inner and outer rings, and an endwise movable collar, the end of said shaft being in bearing engagement with said collar, a pair of diametrically opposed pins freely connecting said inner and outer rings and permitting said outer ring to rock, said outer ring being in annular bearing engagement with said collar, a further pair of diametrically opposed pins in right angular relationship to the first mentioned pair projecting inwardly from said inner ring and positioned in bearings at the inner ends thereof to permit said inner ring to rock at right angles to said outer ring, the rocking about either of said pairs of pins by either of said rings upon application of pressure of said element moving said collar downwardly and hence said shaft and a connecting assembly in engagement with the lower end of said shaft connecting said shaft with said brakes.

2. The device as defined in claim 1 in which said inner and outer rings and said collar encircle the steering column casing of said automobile, said bearings in which said further pair of diametrically opposed pins are positioned at the inner ends thereof being formed in said steering column casing.

LEONARD M. FINES.